United States Patent
Tandon et al.

(10) Patent No.: US 10,506,422 B1
(45) Date of Patent: *Dec. 10, 2019

(54) TRAFFIC HUB SYSTEM TO PROVIDE ROAMING SERVICE IN A WIRELESS ENVIRONMENT

(71) Applicant: Syniverse Technologies, LLC, Tampa, FL (US)

(72) Inventors: Ravi Tandon, Sandweiler (LU); Arjun Nandal, Tampa, FL (US); Lokdeep Singh, Syren (LU)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/823,531

(22) Filed: Nov. 27, 2017

Related U.S. Application Data

(63) Continuation of application No. 14/596,147, filed on Jan. 13, 2015, now Pat. No. 9,832,678.

(51) Int. Cl.
*H04W 4/00* (2018.01)
*H04W 8/08* (2009.01)
(Continued)

(52) U.S. Cl.
CPC .......... *H04W 8/082* (2013.01); *H04W 76/12* (2018.02); *H04W 88/16* (2013.01); *H04W 60/005* (2013.01)

(58) Field of Classification Search
CPC ... H04W 8/082; H04W 76/12; H04W 76/022; H04W 88/16; H04W 60/005; H04W 8/02; H04W 67/30
See application file for complete search history.

(56) References Cited

U.S. PATENT DOCUMENTS

| | | | |
|---|---|---|---|
| 8,577,329 B2 | 11/2013 | Momtahan et al. | |
| 8,620,309 B2 | 12/2013 | Hu et al. | |
| (Continued) | | | |

FOREIGN PATENT DOCUMENTS

WO  2013112642 A2  8/2013

OTHER PUBLICATIONS

3GPP TS 29.274: 3GPP Evolved Packet System (EPS); Evolved General Packet Radio Service (GPRS) Tunnelling Protocol for Control plane (GTPv2-C); Stage 3 (Release 10), Jan. 7, 2015.
(Continued)

*Primary Examiner* — Barry W Taylor
(74) *Attorney, Agent, or Firm* — Andriy Lytvyn; Smith & Hopen, P.A.

(57) ABSTRACT

A traffic hub system comprising a roaming data module to send and receive data for a roaming wireless network for a mobile device, the mobile device comprising a service utilizing a high-speed data network, a home data module to send and receive data for a home wireless network for the mobile device, the home wireless network being a different network than the roaming wireless network, the home wireless network comprising a packet data network gateway. The traffic hub system in one embodiment provides a static policy-based HTTP redirection. The traffic hub system in one embodiment, provides a dynamic policy based redirection. The traffic hub system in on embodiment, provides a seamless captive portal access. The traffic hub system in one embodiment provides data-offloading.

20 Claims, 8 Drawing Sheets

(51) Int. Cl.
*H04W 88/16* (2009.01)
*H04W 76/12* (2018.01)
*H04W 60/00* (2009.01)

(56) References Cited

U.S. PATENT DOCUMENTS

| | | | |
|---|---|---|---|
| 9,060,263 | B1 | 6/2015 | Carames et al. |
| 9,609,544 | B2 | 3/2017 | Raleigh et al. |
| 2007/0232301 | A1 | 10/2007 | Kueh |
| 2008/0046963 | A1 | 2/2008 | Grayson et al. |
| 2009/0129342 | A1 | 5/2009 | Hwang et al. |
| 2010/0017506 | A1* | 1/2010 | Fadell ............... H04M 15/00 709/224 |
| 2011/0271117 | A1 | 11/2011 | Qiang |
| 2012/0034916 | A1* | 2/2012 | Hu ............... H04W 28/24 455/432.1 |
| 2012/0064856 | A1 | 3/2012 | Nandal |
| 2012/0131138 | A1* | 5/2012 | Swenson ............... H04L 47/808 709/217 |
| 2012/0165015 | A1 | 6/2012 | Gupta et al. |
| 2012/0287844 | A1* | 11/2012 | Ophir ............... H04W 28/06 370/315 |
| 2012/0294278 | A1 | 11/2012 | Wang et al. |
| 2013/0012211 | A1 | 1/2013 | Sander et al. |
| 2013/0303114 | A1 | 11/2013 | Ahmad et al. |
| 2014/0301364 | A1 | 10/2014 | Xu et al. |
| 2014/0362807 | A1* | 12/2014 | Bhatnagar ............... H04W 4/00 370/329 |
| 2016/0112896 | A1* | 4/2016 | Karampatsis ..... H04W 28/0252 370/230.1 |
| 2018/0077564 | A1* | 3/2018 | Xu ............... H04W 8/02 |
| 2018/0084012 | A1* | 3/2018 | Joseph ............... H04L 63/1416 |

OTHER PUBLICATIONS

3GPP TS 29.060: General Packet Radio Service (GPRS); GPRS Tunnelling Protocol (GTP) across the Gn and Gp Interface (Release 10), Jan. 6, 2015.

* cited by examiner

TRAFFIC HUB SYSTEM TO PROVIDE ROAMING SERVICE IN A WIRELESS ENVIRONMENT

RELATED APPLICATION

The present application claims priority to U.S. patent application Ser. No. 14/596,147, filed on Jan. 13, 2015, issuing as U.S. Pat. No. 9,832,678 on Nov. 28, 2017 and incorporates that application in its entirety.

TECHNICAL FIELD

Embodiments of the present invention relate to roaming service in a wireless network environment, and more specifically to ensuring a quality of service provided in a wireless network environment.

BACKGROUND OF THE INVENTION

More and more users have mobile devices, such as mobile phones, laptop computers, tablet devices, etc. Additionally, there are many wireless network providers, including cellular providers, which provide network access to the mobile devices. A user's home wireless network is the wireless network with which the user has a subscription or a contract. However, if the user leaves the user's home wireless network, such as when the user is traveling, the user is in a roaming wireless network, and the user's mobile device connects to a cellular provider other than the user's home provider.

When the user is in the roaming wireless network, the user may be provided a pre-defined quality of service from the roaming wireless network. The pre-defined quality of service may depend on the subscription or roaming data package that the user has with the home wireless network, the user segment to which the user belongs, or other factors. The user segment can be based on a status of the user, such as a VIP subscriber, a corporate subscriber, or a normal subscriber. In one example, when the user is in the roaming wireless network, the user be provided with a pre-defined high or low data bandwidth, or speed, based on a roaming package that the user signed up for. If the user has no roaming data package, the user may have to purchase a roaming data plan or pay for the data that the user uses while in the roaming wireless network. The user may only want to pay for a predefined amount of roaming data or may have no available roaming data remaining. In another example, a normal subscriber may have a lower data bandwidth than a VIP subscriber.

BRIEF DESCRIPTION OF THE DRAWINGS

The present invention is illustrated by way of example, and not by way of limitation, in the figures of the accompanying drawings and in which.

DETAILED DESCRIPTION

Embodiments of the present disclosure pertain to ensuring a quality of service provided in a wireless network environment. Service is provided by a roaming wireless network based on a policy defined by the user or a home wireless network. The quality of service to provide to the user in the roaming wireless network is determined by a traffic hub system based on a policy that is set by the home wireless network, based on their relationship with the user. The traffic hub system is capable of redirection based on static policies, dynamic policies, and Access Point Name data offload.

As more and more users have mobile devices connected to roaming wireless networks, it can be time consuming and difficult to provide the quality of service because of the need to add policy and/or charging servers for roaming data that require changes in the home wireless network. Moreover, the user may have to incur fees or not have data service when in a roaming wireless network until the provided quality of service is determined. Current implementations require the home wireless network to add a policy server and/or roaming-related policies.

In one embodiment, in the present system the quality of service to provide to the user is determined without negotiation between the roaming network and the home wireless network. The user is ensured a quality of service on the roaming wireless network in an easy, quick, and seamless manner, without requiring the involvement of the home wireless network or the user.

Figure 1:
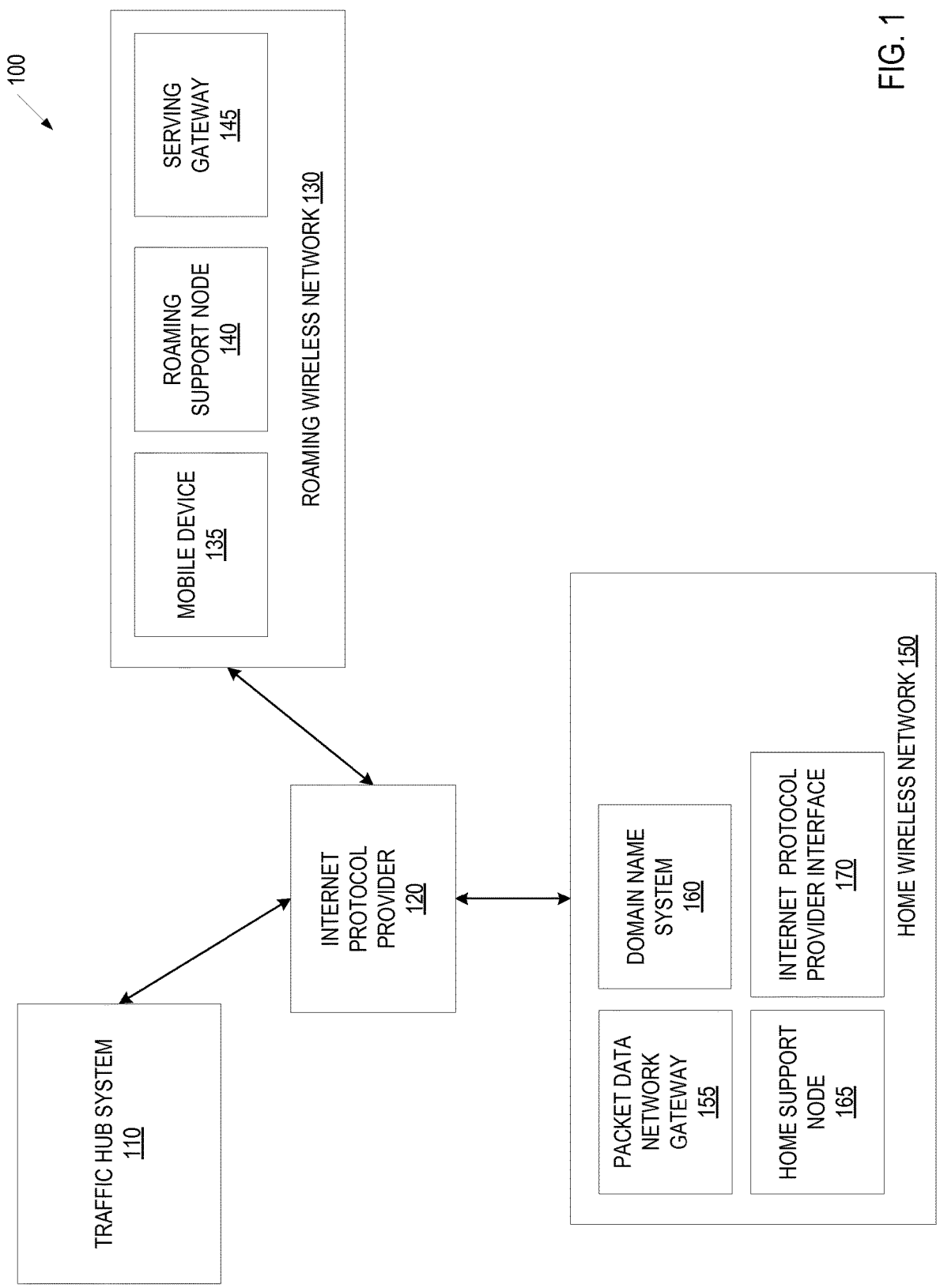
FIG. 1 is an exemplary network architecture on which embodiments of the present invention may be implemented.

FIG. 1 illustrates an exemplary system architecture 100, in accordance with one embodiment of the present disclosure. System 100 comprises a traffic hub system 110 in communication with a roaming wireless network 130 and a home wireless network 150 using an internet protocol provider 120. In one embodiment, the communication is over wireless networks, such as the cellular network, or an Internet connection. The internet protocol provider 120 is a connectionless communication provider, such as Internetwork Packet Exchange (IPx) provider, GPRS Roaming Exchange (GRX) provider, Internet Protocol (IP) network exchanging GTP traffic between serving gateway and packet network gateway, etc.

The traffic hub system 110 may include computing devices that have a wide range of processing capabilities such a personal computer (PC), a server computer, and/or any machine capable of executing a set of instructions (sequential or otherwise) that specify actions to be taken by that machine. Embodiments of the disclosure may operate within a single server device or on multiple server devices. Embodiments of the disclosure may operate as a standalone system.

Roaming wireless network 130 is a cellular network (e.g., a Long Term Evolution (LTE) network). Roaming wireless network 130 can include a mobile device 135, a roaming support node 140, and a serving gateway 145. The mobile device 135 may be any type of telephone device, for example, a device including a processor, a computer-readable medium, and a memory. In one embodiment, the mobile device 135 is a smart phone, or other cellular network connected device which consumes data. In some embodiments, the mobile device 135 may be executing a browser application or other application adapted to communicate over Internet related protocols (e.g., TCP/IP and HTTP) and/or display a user interface. While only a single mobile device 135 is shown in FIG. 1, roaming wireless network 130 may support a large number of concurrent sessions with many mobile devices 135. In one embodiment, the mobile device 135 is part of roaming wireless network 130 when the mobile device is outside of the range of its home wireless network 150.

Roaming support node 140 allows mobile device 135 to move from place place while continuing to connect to the Internet as if from one location. Roaming support node 140 can be the current support node that is handling a session of the user of the mobile device 135. Roaming support node 140 can be a network node that supports the use of GPRS and the GPRS Tunneling Protocol (GTP). Roaming support node 140 can include a serving GPRS support node (SGSN). The SGSN can be responsible for the delivery of data packets from and to the mobile stations within its geographical service area through the internet protocol provider 120. The serving gateway 145 can route and forward data packets of the mobile device 135.

Home wireless network 150 in one embodiment can include a packet data network gateway 155, a domain name system 160, a home support node 165, and an internet protocol provider interface 170. Packet data network gateway 155 can be a PDN Gateway (PGW) that provides connectivity from the mobile device 135 to external packet data networks, such as roaming wireless network 130, by being the point of exit and entry of traffic for the mobile device 135. The internet protocol provider interface 170 can be an interface to an Internet Protocol provider such as an Internet Packet Exchange (IPX) or GPRS Roaming Exchange (GRX).

The domain name system 160 is a hierarchical distributed naming system that performs a lookup for roaming traffic, including data packets of the mobile device 135. As a result of the lookup for roaming traffic, the domain name system 160 can return an IP that corresponds to the traffic hub system 110 such that the roaming traffic is routed through the traffic hub system 110.

The home support node 165 can be a gateway GPRS support node (GGSN). The GGSN can be responsible for the internetworking between the GPRS network and external packet switched networks, like the Internet (not shown) and X.25 networks (not shown). The home support node 165 can utilize the internet protocol provider 120 to perform the internetworking. In one embodiment, there is no direct connection between the roaming wireless network 130 and the home wireless network 150 because each network belongs to a different mobile network operator. In this embodiment, the internet protocol provider 120 can establish communication between the home wireless network 150 and the roaming wireless network 130, such that the wireless networks are connected for traffic exchange. For example, the internet protocol provider 120 is an IPX provider, a GRX provider, etc.

Traffic hub system 110 is logically positioned between the roaming wireless network 130 and the home wireless network 150. In one embodiment, traffic hub system 110 is positioned between roaming support node 140 and home support node 165. In one embodiment, traffic hub system 110 is positioned between serving gateway 145 and packet data network gateway 155.

During operation of system 100, traffic hub system 110 receives a request for data from mobile device 135 while the mobile device 135 is in roaming wireless network 130. Traffic hub system 110 negotiates a bandwidth with the roaming wireless network 130 based on a policy associated with home wireless network 150. The bandwidth can be an upload data rate, a download data rate, or any other data rate that is applicable to the mobile device 135. The bandwidth can be a minimum value of quality of service provided by either the home wireless network 150 or the roaming wireless network 130 to the mobile device 135. The traffic hub system 110 can update a quality of service parameter based on the negotiated bandwidth by providing a response to the roaming wireless network 130 using the negotiated bandwidth.

Figure 2:
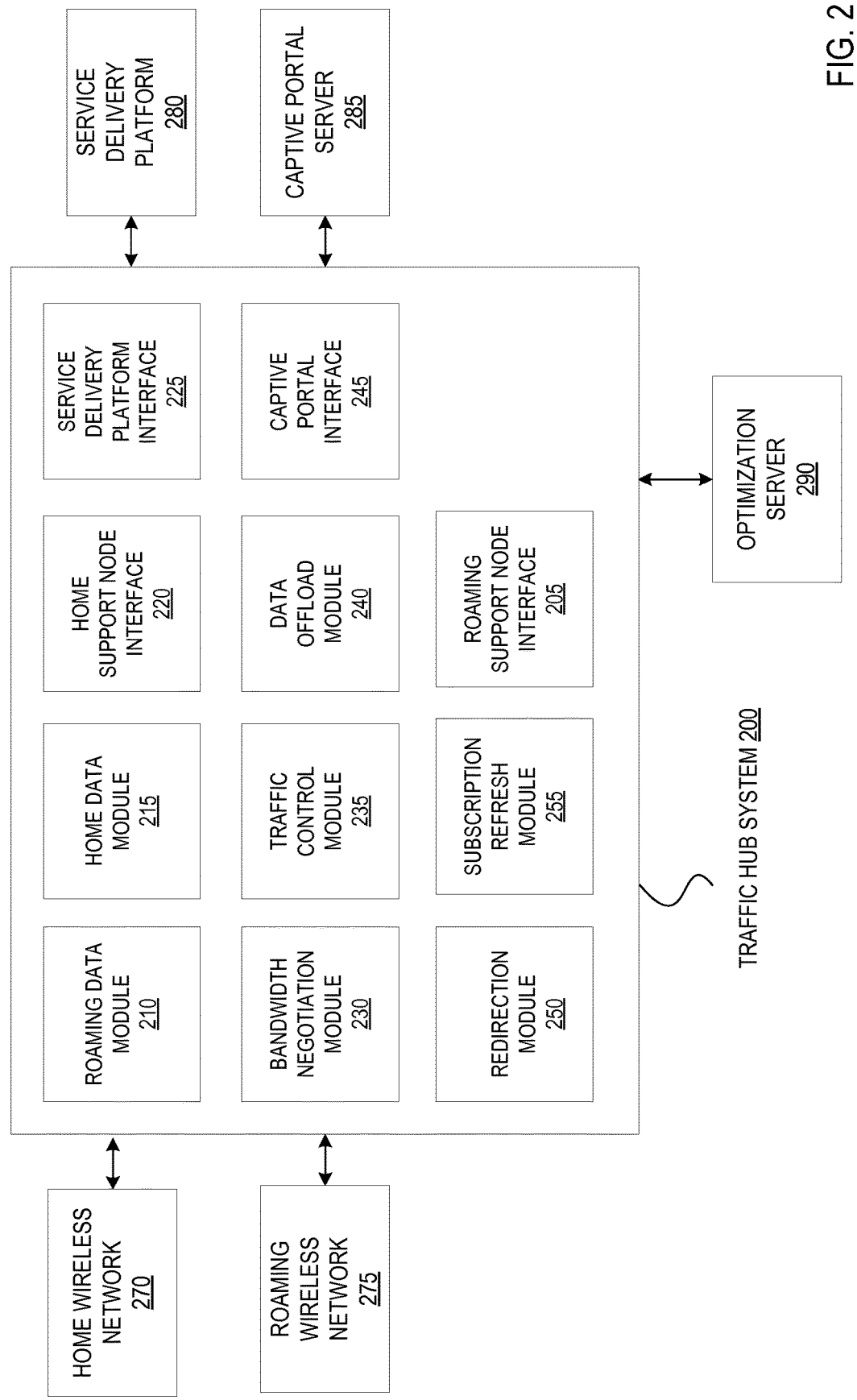
FIG. 2 is a block diagram of one embodiment of the traffic hub system.

FIG. 2 illustrates a block diagram of one embodiment of the traffic hub system. The traffic hub system 200 is coupled to a roaming wireless network 275, which is the partner providing service to the mobile device (not shown). The mobile device is associated with a home wireless network 270, which is coupled to the traffic hub system 200 as well. The traffic hub system 200 is coupled to a service delivery platform 280, a captive portal server 285, and an optimization server 290, in one embodiment. More or fewer components may be included in the traffic hub system 200 without loss of generality.

The traffic hub system 200 can be hosted by any type of computing device. The traffic hub system 200 can be a server, a cloud-hosted service, or another type of implementation.

Home wireless network 270 can be a cellular network (e.g., a Long Term Evolution (LTE) network). The home wireless network 270 can host one or more subscribers, which can be users of the home wireless network 270 that have a contract with the provider of the home wireless network 270.

Roaming wireless network 275 can be a cellular network (e.g., a Long Term Evolution (LTE) network). The roaming wireless network 275 is a cellular network that is outside of the range of the home wireless network 270 of a user or subscriber. The subscriber does not have a contract with the provider of the roaming wireless network 275, and the mobile device of the subscriber is in a roaming state when the mobile device is receiving a mobile signal from the roaming wireless network 275.

The service delivery platform 280 can store a policy for each subscriber of the home wireless network 270. In one embodiment, the service delivery platform 280 also stores an allowed or defined bit rate for each service, or application, associated with each subscriber. For example, if a subscriber has a mail service, a weather service, and a browser service downloaded on a mobile device, the service delivery platform 280 may store a bit rate for the mail service, a bit rate for the weather service, and a bit rate for the browser service. The bit rates can be defined by the home wireless network 270, by the service, by the subscriber, etc. In another embodiment, the service delivery platform 280 receives the service level data from the home wireless network, the mobile device, and/or the application.

The captive portal server 285 can store mappings of session identifiers and subscriber identifiers to provide keyless subscriber authentication, in one embodiment. The captive portal server 285 can further store billing information, account information, or other personalized information for subscribers of the home wireless network 270. This enables subscription updates or the addition of services without requiring the user to log in and go through a long and complicated process. This will be described in more detail below.

The optimization server 290 can optimize data traffic received from the traffic hub system 200. In one embodiment, the optimization server 290 provides the optimized data traffic back to the traffic hub system 200. In an alternate embodiment, the optimization server 290 provides the optimized data to the wireless network that the subscriber associated with the data traffic is in. For example, if the subscriber is in the roaming wireless network 275, the optimization server 290 will provide the optimized data traffic to the roaming wireless network 275.

The traffic hub system 200 can include a roaming data module 210, a roaming support node interface 205, a home data module 215, a home support node interface 220, a service delivery platform interface 225, a bandwidth negotiation module 230, a traffic control module 235, a data offload module 240, a captive portal interface 245, a redirection module 250, and a subscription refresh module 255.

The roaming data module 210 can send data to and receive data from the roaming wireless network 275. The data can include session creation requests, subscription requests, data requests, data packets, or any other data that can be transmitted by or between wireless networks.

The home data module 215 can send data to and receive data from the home wireless network 275. The data can include session creation requests, subscription requests, data requests, data packets, or any other data that can be transmitted by or between wireless networks.

The home support node interface 220 can be an interface that acts as a GGSN or PGW towards the roaming wireless network 275. This interface allows the traffic to flow seamlessly from the home wireless network 270 to the traffic hub system 200 to the roaming wireless network 275 and vice versa. This can be done without impacting or requiring any change in the home wireless network node 270 or the roaming wireless network node 275. The roaming support node interface 205 parallels the home support node interface 220 and acts as a SGSN or SGW towards the home wireless network 270.

The service delivery platform interface 225 allows data to be sent to and received from the service delivery platform 280. For example, the service delivery platform interface 225 can provide a request for authentication of a subscriber to the service delivery platform 280 and receive a response to the request for authentication. The service delivery platform interface 225 can provide data accounting information to the service delivery platform 280 to track data use for a subscriber or session. The service delivery platform interface 225 can obtain a policy from the service delivery platform 280. The policy defines the bandwidth for a subscriber the data traffic for the subscriber. The service delivery platform interface 225 can provide a request to the service delivery platform for bit rates or other information associated with a service used by a mobile device and receive the bit rates or other information from the service delivery platform 280.

The bandwidth negotiation module 230 negotiates bandwidth for a mobile device with the roaming wireless network 275 based on the policy defined by the home network. In one embodiment, the bandwidth negotiation module 230 obtains the policy by providing a request for the policy to the service delivery platform interface 225, and can receive the policy from the service delivery platform 280 via the service delivery platform interface 225. In an alternate embodiment, the bandwidth negotiation module obtains the policy from the home wireless network 270 by providing a request to the home data module 215 and receiving the policy from the home wireless network via the home data module 215. In yet another embodiment, the bandwidth negotiation module 230 obtains the policy from storage (not shown).

In one embodiment, the policy defines what should happen when the mobile device has met a threshold, such as defining the bandwidth to provide to the mobile device when the mobile device has reached a data quota or reducing or otherwise limiting the bandwidth to provide to the mobile device once a bandwidth quota for the mobile device or user has been reached. In another embodiment, the policy is a throttling policy that defines the services, or applications, that should be throttled when the mobile device is in the roaming wireless network. The services used by the mobile device can use a wireless communication for high-speed data, such as a Long-Term Evolution (LTE) network. A service can be a guaranteed bit rate service, which requires a predefined or guaranteed bit rate or bandwidth, or a non-guaranteed bit rate service, which does not require a defined or guaranteed bit rate or bandwidth.

If the home network policy defines a value for the bandwidth, the bandwidth negotiation module 230 can limit the bandwidth provided to the roaming wireless network 275. If the policy requires throttling, the bandwidth negotiation module 230 can throttle the services, command throttling by the roaming wireless network 275, or can adjust the bandwidth for the services.

In one embodiment, to throttle a service, the bandwidth negotiation module 230 can provide a request for the service to the service delivery platform interface 225 and obtain the bandwidth permitted for the service from the service delivery platform 280 via the service delivery platform interface 225. The bandwidth negotiation module 230 can generate a create request that includes the permitted bandwidth and provide the create request to the home data module 215. The bandwidth negotiation module 230 will thereby throttle the service to only receive the bandwidth defined in the policy for the service. This may be less than the bandwidth requested by the service.

In one embodiment, to throttle a service, the bandwidth negotiation module 230 can receive a request from a service on a mobile device, with a requested bandwidth for the service. The bandwidth negotiation module 230 can determine whether there are additional services associated with the mobile device that are currently using bandwidth on the mobile device. If there are no additional services associated with the mobile device, the bandwidth negotiation module 230 can determine if the requested bandwidth for the service is greater than the total allowed bandwidth for the services associated with the mobile device. If the requested bandwidth for the service is not greater than the total allowed bandwidth, the bandwidth negotiation module 230 can generate a create request for the service with the requested bandwidth to allow creation of the service with the requested bit rate and can update the allowed bit rate to reflect the requested bandwidth provided to the service. If the requested bandwidth for the service, in addition to the other services being used, is greater than the total allowed bandwidth, the bandwidth negotiation module 230 can reject the request from the service such that the creation of the service with the requested bit rate is not allowed because there is not sufficient bandwidth for the service.

If there are additional services associated with the mobile device, the bandwidth negotiation module 230 can determine whether the aggregate of the bandwidth for the additional services and the requested bandwidth is greater than the total allowed bandwidth. If the aggregate is not greater than the total allowed bandwidth, the bandwidth negotiation module 230 can generate a create request to allow creation of the service with the requested bandwidth and can update the allowed bit rate to reflect the requested bandwidth provided to the service. In one embodiment, if the requested bandwidth for the service is greater than the total allowed bandwidth, the bandwidth negotiation module 230 can reject the request from the service such that the creation of the service with the requested bandwidth is not allowed because there is not sufficient bandwidth for the service. In an alternate embodiment, if the requested bandwidth for the service is greater than the total allowed bandwidth, the bandwidth negotiation module 230 can reject the request from one or more of the additional services such that the creation of one or more of the additional services is not allowed because there is not sufficient bandwidth for the one or more additional services.

The bandwidth negotiation module 230 can adjust the bandwidth of one or more services based on the policy. The bandwidth negotiation module 230 can determine the one or more services to adjust the bandwidth of based on a priority associated with the services. The bandwidth negotiation module 230 can receive a request for a service with a requested bandwidth and a priority associated with the service. The bandwidth negotiation module 230 can determine if the requested bandwidth exceeds an allowed bandwidth for the mobile device. If the bandwidth negotiation module 230 determines that the requested bandwidth does not exceed the allowed bandwidth, the bandwidth negotiation module 230 can generate a create request for the service to allow creation of the service with the requested bandwidth and can update the allowed bit rate to reflect the requested bandwidth provided to the service.

If the bandwidth negotiation module 230 determines that the requested bandwidth exceeds the allowed bandwidth, the bandwidth negotiation module 230 can determine if the priority for the service exceeds the priority of at least one non-guaranteed bit rate service that will allow the bandwidth negotiation module 230 to provide the requested bandwidth to the service. If the priority for the service exceeds the priority of at least one non-guaranteed bit rate service, the bandwidth negotiation module 230 can reduce the bandwidth of at least one non-guaranteed bit rate service with a lower priority than the priority of the service and provide the bandwidth to the service by generating a create request for the service and updating the allowed bandwidth for the mobile device.

If the priority for the service does not exceed the priority of at least one non-guaranteed bit rate service, the bandwidth negotiation module 230 can determine whether the priority for the service exceeds a priority of at least one guaranteed bit rate service that will allow the bandwidth negotiation module 230 to provide the requested bandwidth to the service. If the priority for the service exceeds the priority of at least one guaranteed bit rate service, the bandwidth negotiation module 230 can delete the at least one guaranteed bit rate service with a lower priority than the priority of the service and provide the bandwidth to the service by generating a create request for the service and updating the allowed bandwidth for the mobile device. If the priority for the service does not exceed the priority of at least one guaranteed bit rate service, the bandwidth negotiation module 230 can provide a reject response for the request because there is insufficient bandwidth to provide to the service, and no other services can be adjusted to obtain the requested bandwidth.

The traffic control module 235 updates a quality of service parameter based on the negotiated bandwidth, transparently to the roaming wireless network 275 and without enforcement of the policy by the home wireless network 270. The negotiated bandwidth will be respected by all of the parties. In one embodiment, the roaming wireless network 275, the home wireless network 270, and/or the traffic control module 235 can enforce the quality of service parameter negotiated through the traffic hub system 200. In one embodiment, the traffic control module 235 updates the quality of service parameter based on the negotiated bandwidth by providing a create request including the negotiated bandwidth to the home wireless network 275 to create a session for the service and by providing a response to the roaming wireless network 275 using the negotiated bandwidth. Therefore, once the home wireless network 270 defines a policy and shares it with the traffic hub system 200, the home wireless network 270 may skip the enforcement of the policy because the roaming wireless network 275 will provide the negotiated bandwidth based on the negotiated quality of service parameter. However, the roaming wireless network 275 does not need to be aware of the specific policy defined by the home wireless network 275.

The data offload module 240 can offload selected subscriber data traffic, in one embodiment. The data offload module 240 offloads selected subscriber data traffic by sending the selected subscriber data traffic to the Internet without sending the selected subscriber data traffic through the home gateway 275 or home support node 280. In one embodiment, this means that the subscriber is not charged for the selected subscriber data traffic, and it doesn't count against the subscriber's bandwidth cap. The data offload module 240 can send the selected subscriber data traffic to the Internet directly by updating the destination internet protocol (IP) address of the subscriber data traffic to an address that goes directly to the Internet.

The captive portal interface 245 can send data to and receive data from the captive portal server 285. The captive portal interface 245 can receive updates, mappings, or other information from other modules in the traffic hub system 200 (e.g., subscription refresh module 255) and provide the updates, mappings, or other information to the captive portal server 285. The captive portal interface 245 can further receive requests, responses, or other information from the captive portal server 285 and route the received requests, responses, or other information to the appropriate module in traffic hub system 200.

The redirection module 250 can redirect data traffic from the roaming wireless network 275. The redirection module 250 can receive a data request from a roaming wireless network 275 that includes subscriber information associated with a subscriber and information about home wireless network 270. Based on the subscriber information and/or information about home wireless network 270, the redirection module 250 can determine whether to redirect the data request. In one embodiment, the redirection module 250 determines whether the request should be redirected based on an end user IP (internet protocol) address. In another embodiment, the redirection module 250 determines whether to redirect the data request based on the subscriber information. If redirection module 250 determines to redirect the data request, the data associated with the data request can modify the destination IP and/or transmission control protocol (TCP) headers of the data request with the IP address and TCP ports of the optimization server 290, such that the data request is rerouted to the optimization server 290.

The subscription refresh module 255 enables the automatic refreshing of a subscription, changing a subscription, or adding of a subscription without requiring the subscriber to log in or provide other identification separate information to the roaming wireless network or the home wireless network. The subscription refresh module 255 can automatically identify the subscriber by mapping a session identifier for the session of the user with a subscriber identifier, in one embodiment. In one embodiment, the subscription refresh module 255 updates the captive portal server 290 to provide keyless user authentication, and enables subscribing to a subscriber plan on behalf of the user.

The session identifier for the session can be a JSession ID or other identifier related to a series of related message exchanges. The subscriber identifier identifies the user of the mobile device and can be a unique identification associated with all cellular networks. For example, the subscriber identifier can be an International Mobile Subscriber Identity (IMSI). The subscription refresh module 255 can map the session identifier and the subscriber identifier by creating a relationship between the session identifier and the subscriber identifier. The subscription refresh module 255 can provide the mapping to the captive portal server 290.

In one embodiment, when the subscriber with the subscriber identifier has no additional data bandwidth available (e.g., used up all the data in a data plan paid for by the subscriber, or has no data plan currently), the subscription refresh module 255 provides a request to the captive portal server 290 to purchase additional data for the subscriber. In one embodiment, the user may be automatically redirected to the refresh module 255, if they have no bandwidth available and attempt to connect to the roaming server for data. In one embodiment, the subscription refresh module 255 can obtain the information related to the subscriber, such as billing information or other personalized information associated with the user, without requiring the subscriber to login to the captive portal server 290 or provide any information to the captive portal server 290.

Figure 3:
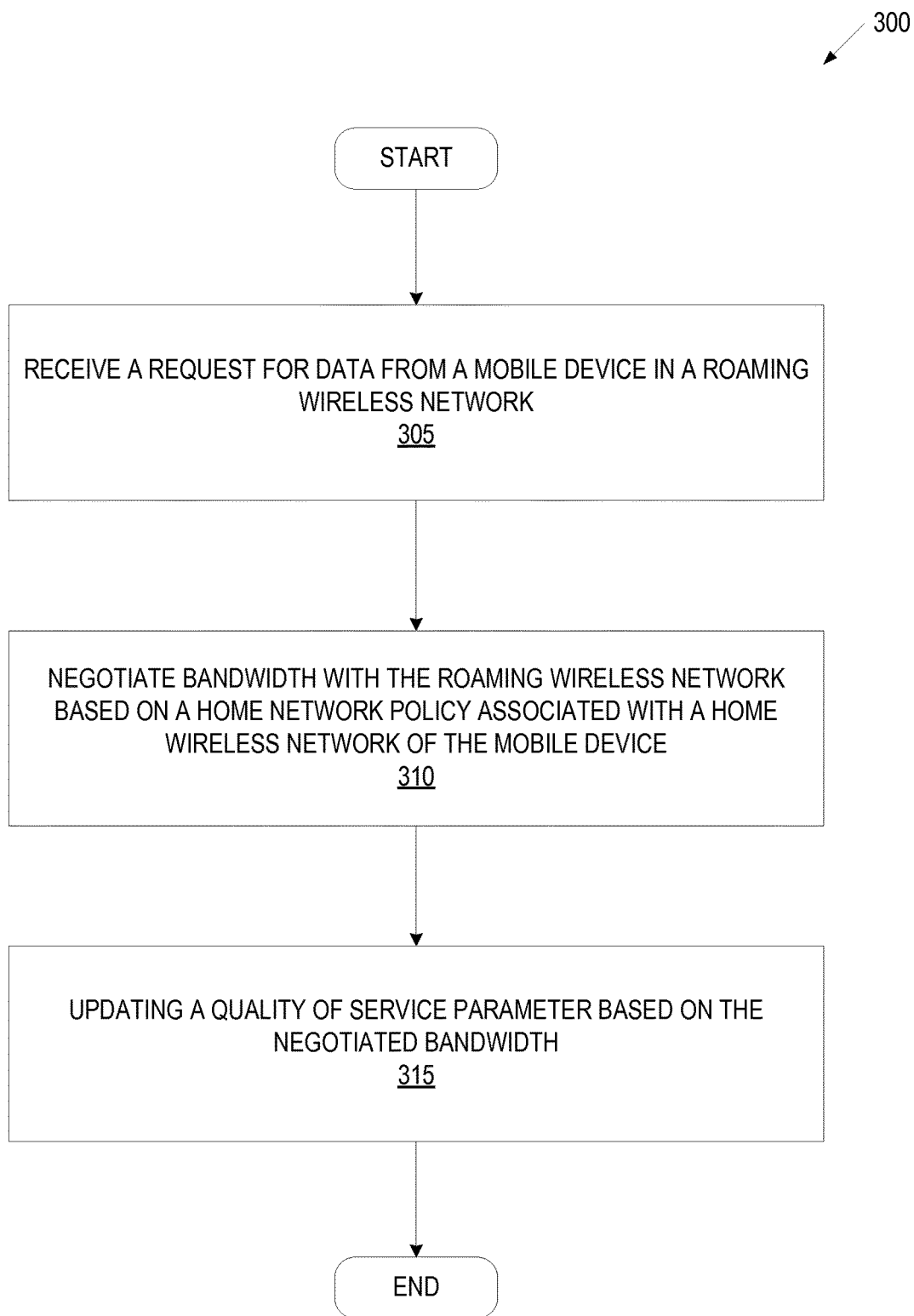
FIG. 3 illustrates an embodiment of a method of negotiating quality of service in a wireless network environment.

FIG. 3 is an overview flowchart of one embodiment of a method 300 for negotiating quality of service in a wireless network environment. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the traffic hub system 200 of FIG. 2.

At block 305, processing logic receives a request for data from a mobile device in a roaming wireless network. In one embodiment, the mobile device is in a roaming wireless network when the mobile device is outside of the range of its home network, which a user of the mobile device has a contract with. For example, if a user of the mobile device has a contract with AT&T, then the mobile device will be in a home wireless network whenever the mobile device is on AT&T's mobile network. If the user is traveling outside of AT&T's mobile network, for example to Canada and uses Bell Mobility, then Bell Mobility would be the roaming wireless network for the mobile device. Of course, roaming networks may be used without traveling internationally, for example when traveling to a part of the country that does not have AT&T coverage.

At block 310, traffic hub system negotiates a bandwidth with the roaming wireless network based on a home network policy from the home wireless network of the mobile device. The bandwidth negotiation can include one or more of an upload data rate, a download data rate, or any other rate that is applicable to a mobile device. The bandwidth can be a minimum quality of service guarantee provided by the roaming wireless network to the mobile device, rather than a maximum range.

In one embodiment, the policy also defines other service related parameters and actions. For example, the home network policy may define how to interact with the user/device when the mobile device has reached a data quota. Interactions may include reducing or otherwise limiting the bandwidth, locking out the user from data services, alerting the user that additional use without an updated subscription would be at a particular price per Mbit, etc. For example, if the mobile device has a $20 data package for data when the mobile device is in the roaming wireless network, the home network policy defines that the bandwidth for the mobile device should be throttled to 64 kbps (kilobits per second) once the $20 has been used. Alternatively, the bandwidth may be throttled to zero, or another rate.

In one embodiment, the home network policy is a throttling policy that defines the services and/or applications that should be throttled when the mobile device is in the roaming wireless network. The services used by the mobile device can include services that use a wireless communication for high-speed data, such as a Long-Term Evolution (LTE) network or a high speed packet access (HSPA) network. For example, the home network policy may define that certain services and/or applications, such as non-guaranteed bit rate applications, receive a lower bandwidth than guaranteed bit rate applications when the mobile device is in the roaming wireless network.

A guaranteed bit rate application is an application that requires a defined minimum bandwidth, such as a streaming media application, a real-time game, a videoconferencing application, a Voice over IP (VoIP) application, etc. A non-guaranteed bit rate application does not require, or has not received, a defined bandwidth guarantee, such as a mail application, a turn-based online game where real-time lag is not a factor, etc. In one embodiment, the home network policy defines relative bandwidth rates. For example, in one embodiment, the policy may state that an application that streams data is provided a lower data rate than a mail application. In one embodiment, the home network policy defines that an outside entity, such as the roaming wireless network or a service delivery platform (SDP) sets the bandwidth for the mobile device when the mobile device is on the roaming wireless network.

Figure 4:
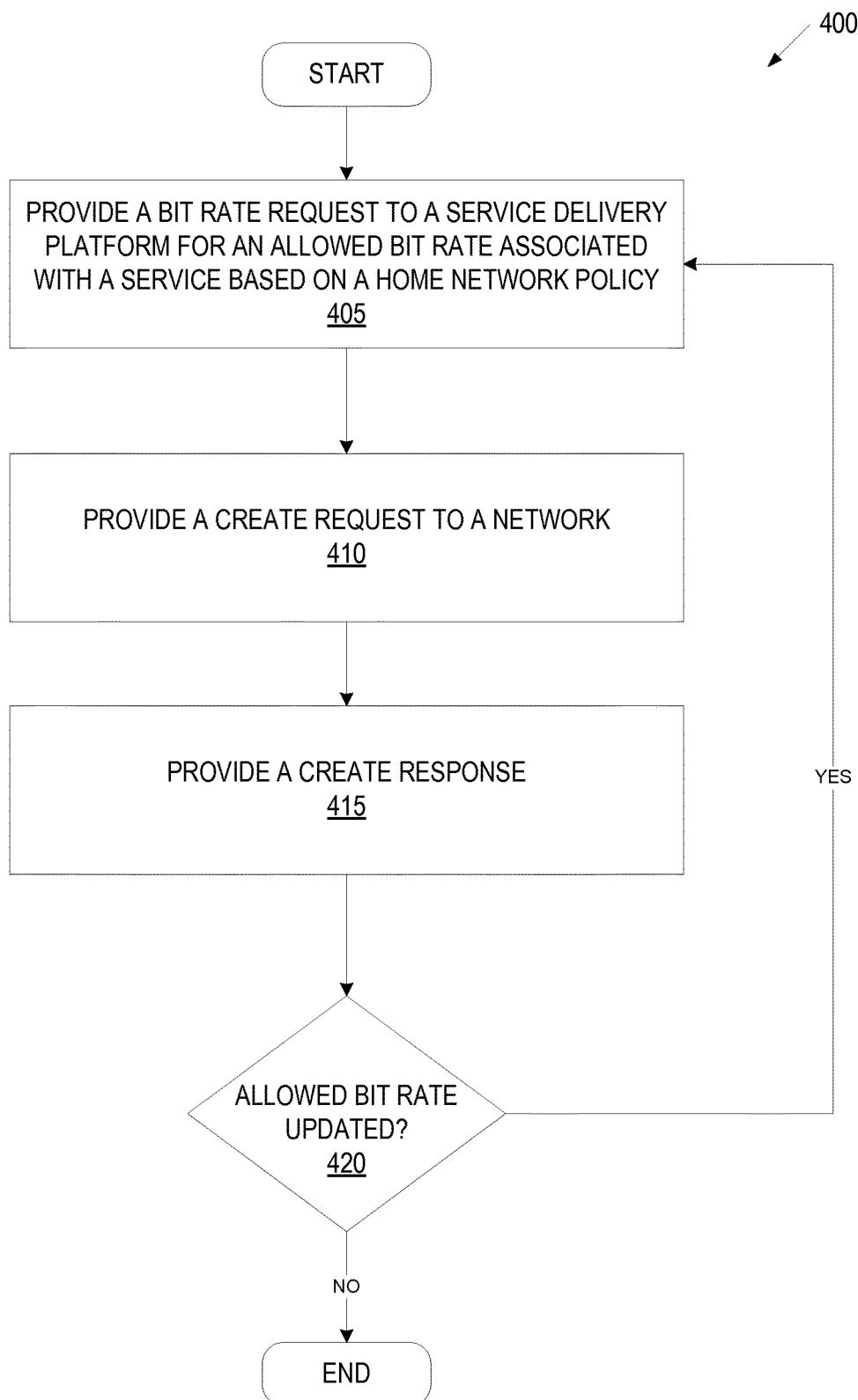
FIG. 4 illustrates an embodiment of a method of throttling non-guaranteed bearers.
Figure 5:
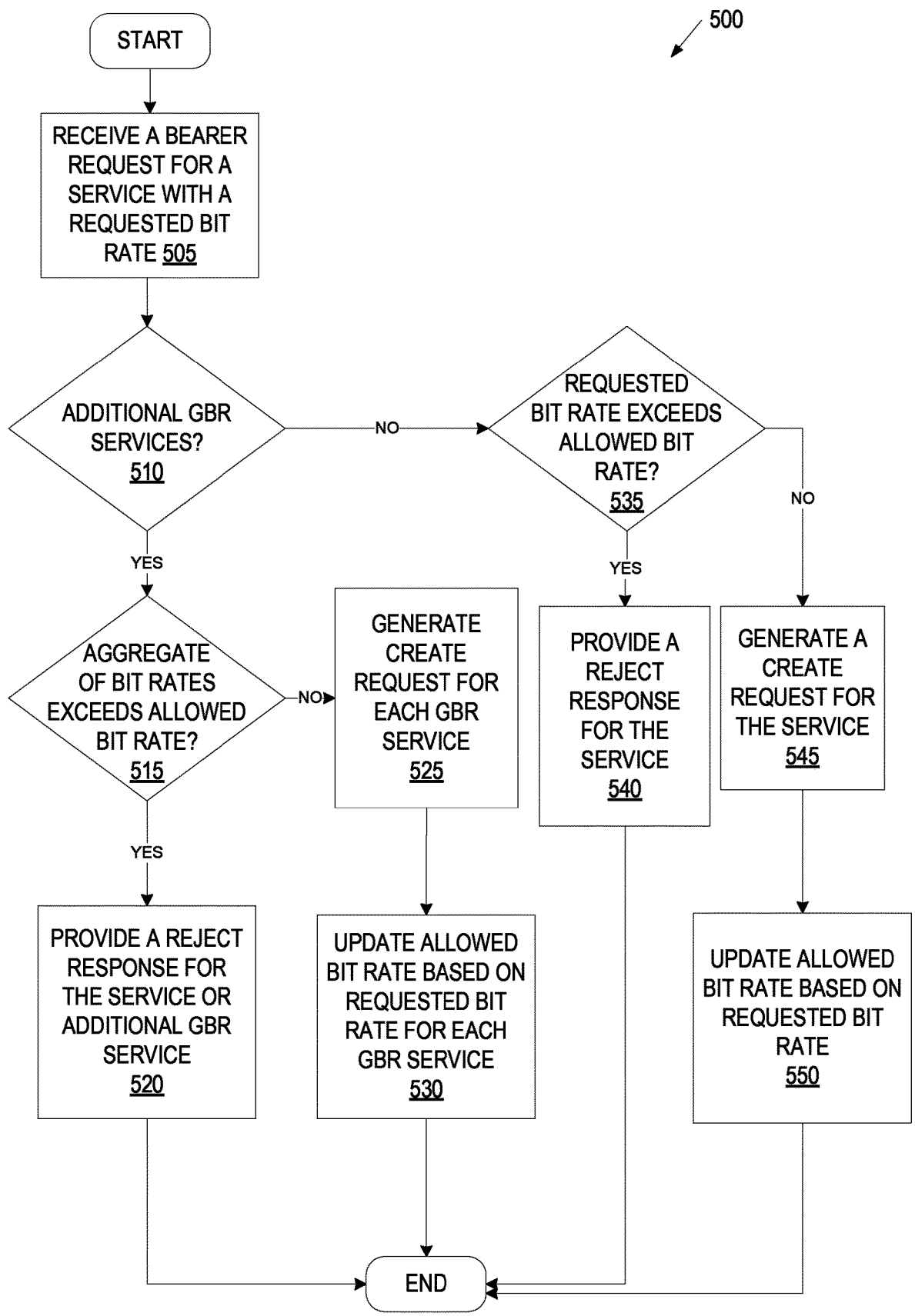
FIG. 5 illustrates an embodiment of enforcing throttling of guaranteed bit rate bearers in a roaming wireless network.
Figure 6:
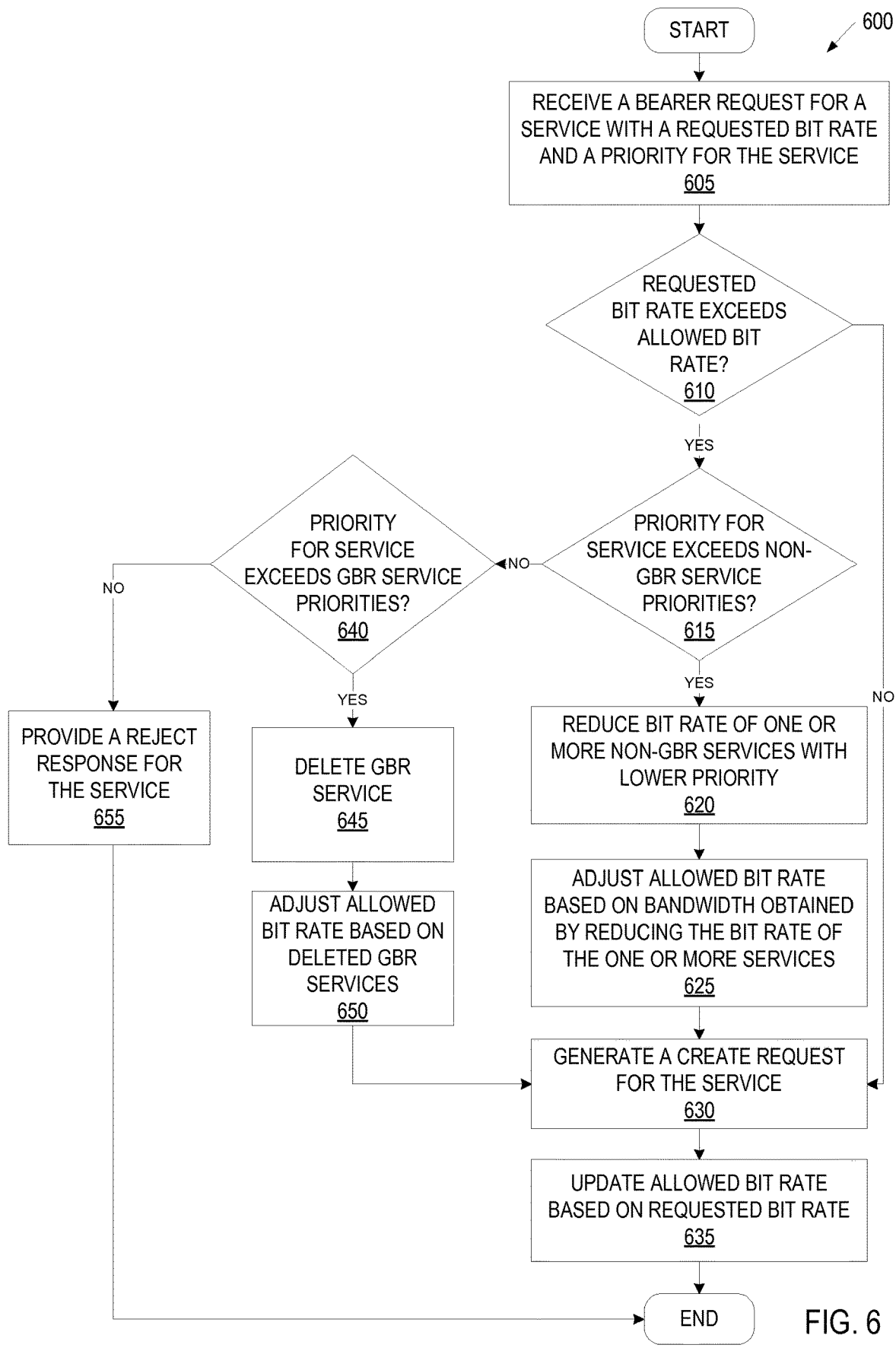
FIG. 6 illustrates an embodiment of adjusting bandwidth for bearers.

Processing logic can negotiate the bandwidth based on the home network policy by requesting the bandwidth as defined in the home network policy. If the home network policy defines an actual bandwidth, processing logic limits the bandwidth provided to the roaming wireless network. If the home network policy defines a throttling policy, processing logic requests the bandwidth based on the throttling policy. In one embodiment, a combination of the home network policy and a roaming network policy are used to arrive at a bandwidth allowance for a subscriber. FIGS. 4, 5, and 6 describe various embodiments of negotiating the bandwidth based on the home network policy when the home network policy defines a throttling policy.

At block 315, the system updates quality of service parameters based on the negotiated bandwidth. In one embodiment, the system updates the quality of service parameter(s) based on the negotiated bandwidth by providing a response to the roaming wireless network using the negotiated bandwidth. For example, if an application (or service) for the mobile device is included in the home network policy as requiring a bandwidth of 64 kbps, in one embodiment, the system will provide a "create" response to the roaming wireless network for a bandwidth of 64 kbps for the application. Therefore, once the home wireless network puts a home network policy in place, the home wireless network does not need to enforce the policy. The policy is enforced by the traffic hub system. Moreover, in one embodiment, the roaming wireless network does not need to be aware of the home network policy.

This enables the system to enforce the home network policies on a roaming subscriber, without requiring direct negotiation or interaction between the roaming network and the home network. Furthermore, the home network can define policies which are more granular than policies it could directly negotiate.

FIG. 4 illustrates one embodiment of a method 400 for throttling non-guaranteed bearers in a wireless network environment. Method 400 can be performed by a processing logic that can comprise hardware (e.g., circuitry, dedicated logic, programmable logic, microcode, etc.), software (e.g., instructions run on a processing device), or a combination thereof. In one embodiment, method 400 is performed by the traffic hub system 200 of FIG. 2.

At block 405, processing logic provides a bit rate request to a service delivery platform (SDP) for an allowed bit rate associated with a service based on the home network policy. The service can be a non-guaranteed bit rate service that does not require a defined or guaranteed bit rate. In one embodiment, the SDP can store an allowed bit rate for each non-guaranteed bit rate service for the mobile device, based on the policy. In an alternate embodiment, the SDP can share an aggregate maximum bit rate, which is the maximum sum of all the bit rates used across all non-guaranteed bit rates services. In one embodiment, the service has two allowed bit rates, a first allowed bit rate for uploading data and a second allowed bit rate for downloading data. For example, the service has a first allowed bit rate that is 128 kbps for uploading data and a second allowed bit rate that is 64 kbps for downloading data. In another embodiment, the service has the same bit rate for uploading data and downloading data.

At block 410, processing logic provides a create request to a network. In one embodiment, processing logic provides the create request to a home network gateway based on the allowed bit rate associated with the service. The allowed bit rate is received from the SDP in response to the bit rate request. In this embodiment, the create request to the home network gateway includes the allowed bit rate for the service. By providing a create request to the home network gateway, processing logic can facilitate the establishment of a GTP tunnel between the roaming wireless network and the home wireless network. Moreover, by providing the allowed bit rate to the home network gateway, the home network gateway can track data information for the service and track the data for billing and tracking purposes.

In an alternate embodiment, processing logic provides a create request to a roaming wireless network to create a bearer for the service based on a guaranteed bit rate for the service (e.g., when the service is a guaranteed service). The create bearer request is sent to Roaming wireless network to determine whether the bitrate for that particular bearer is acceptable to Roaming wireless network. Roaming wireless network may reject the request if there are any resource constraints at its end.

At block 415, processing logic provides a create response. In one embodiment, processing logic provides the create response with the allowed bit rate to the roaming wireless network. In this embodiment, in response to the create response, the roaming wireless network will only provide the allowed bit rate to the service. For example, if the allowed bit rate is 64 kbps for both uploading data and downloading data, the roaming wireless network and/or the home wireless network will only allow the service to upload data at 64 kbps and download data at 64 kbps. In this embodiment, upon receiving the create response, the roaming wireless network can create a GTP tunnel for the service and allow the service to upload and download data at the allowed bit rate.

The process determines, at block 420 whether the allowed bit rate for a service is updated, (e.g., if the service needs to be throttled). If so, the process returns to block 405 with the updated allowed bit rate to throttle the service. For example, if the service needs to be throttled from 64 kbps to 32 kbps, processing logic will obtain the updated allowed bit rate from the SDP, provide a create request to the home network gateway with the updated allowed bit rate, and provide a create response with the updated allowed bit rate to the roaming wireless network. The update of the allowed bit rate is handled by the method 400 without requiring the home wireless network to enforce the updated allowed bit rate. Moreover, the allowed bit rate can be updated without further negotiation with the roaming wireless network.

The method 500 begins at block 505, where processing logic receives a guaranteed bitrate (GBR) bearer request for a service with a requested bit rate. Processing logic can receive the bearer request from the home wireless network of the mobile device executing the service. The bearer request can be a request from a GBR service, or application, and can include the requested bit rate for the GBR service. For example, a streaming application on a mobile device requests a guaranteed bit rate of 64 kbps. The bearer request can include a single requested bit rate for both an upload bit rate and a download bit rate, or can include multiple requested bit rates, such as a requested bit rate for uploading data and a requested bit rate for downloading data. In one embodiment, the bit rate may differ within a single service. For example, browsing potential videos to watch may have a different bitrate guarantee than video streaming, in one embodiment.

At block 510, processing logic determines whether there are additional GBR services associated with the mobile device. Processing logic can determine whether there are additional GBR services associated with the mobile device by accessing information about services associated with the mobile device that have a current session in the roaming wireless network. The information about services associated with the mobile device can be stored on the mobile device, in the traffic hub system, or can be otherwise accessible to processing logic.

If there are no additional GBR services associated with the mobile device that have a current session in the roaming wireless network, processing logic determines that there are no additional GBR services associated with the mobile device and the method 500 proceeds to block 535. If there are additional GBR services associated with the mobile device that have a current session in the roaming wireless network, processing logic determines that there are additional GBR services associated with the mobile device and the method 500 proceeds to block 515.

At block 515, processing logic determines if an aggregate of the requested bit rates associated with the currently requested GBR service and the bit rate associated with each of the existing GBR services exceeds a cumulative allowed bit rate. In one embodiment, the GBR allowed bit rate is defined by the home network policy associated with the mobile device. In an alternate embodiment, the GBR allowed bit rate is configured in a dynamic policy, which is provided to processing logic by the home wireless network of the mobile device. The aggregate of the requested bit rate can be a sum of the requested bit rate for the GBR service for which the bearer request was received and the bit rates for each of the additional GBR services associated with the mobile device. For example, the GBR allowed bit rate is 256 kbps, the requested bit rate for the bearer request is 64 kbps, and the mobile device currently has a second GBR service with a bit rate of 128 kbps. In this example, the aggregate of the requested bit rate and the additional GBR service is 64 kbps+128 kbps=192 kbps, which is less than the GBR allowed bit rate of 256 kbps. Other methods of aggregating the requested bit rates can be used without departing from the scope of the present application.

Processing logic can determine if the aggregate of requested bit rate associated with the GBR service and the requested bit rate associated with each of the additional GBR services by comparing the aggregate of requested bit rate associated with the GBR service and the requested bit rate associated with each of the additional GBR services. If the aggregate of the requested bit rate associated with the GBR service and the bit rate associated with each of the additional GBR services is not greater than a GBR allowed bit rate, there is additional bandwidth available and the method 500 proceeds to block 525. If the aggregate of the requested bit rate associated with the GBR service and the bit rate associated with each of the additional GBR services is greater than a GBR allowed bit rate, there is no additional bandwidth currently available and the method 500 proceeds to block 520.

At block 520, processing logic provides a reject response for the service or an additional GBR service. Processing logic provides a reject response because the overall throughput, or bit rate, for the GBR services currently using data on the mobile device exceeds the allowed GBR bit rate. Therefore, there is no additional bandwidth available for the service because processing logic is guaranteeing that the mobile device will not use more than the allowed bit rate. Processing logic can provide the reject response to the home wireless network or to the wireless network from which the bearer request was received.

Processing logic can provide a reject response for the GBR service for which the bearer request was received if the GBR service is the only service for which there is an outstanding bearer request (e.g., the additional GBR services have established sessions). Processing logic may determine the GBR service for which to provide a reject response if there are multiple bearer requests outstanding. In one embodiment, processing logic determines the GBR service for which to provide the reject response based on the aggregate of the requested bit rates for each of the services with an outstanding bearer request. For example, the GBR allowed bit rate is 128 kbps, the requested bit rate for the bearer request is 64 kbps, and the mobile device currently has a second GBR bearer request with a requested bit rate of 256 kbps. In this example, the aggregate of the requested bit rate and the additional GBR service is 64 kbps+256 kbps=320 kbps, and the second GBR bearer request will be rejected because the requested bit rate for the second GBR bearer is greater than the GBR allowed bit rate.

In another embodiment, processing logic determines the GBR service for which to provide the reject requested based on a priority of the bearers. In an alternate embodiment, processing logic determines the GBR service for which to provide the reject request based on an order in which the bearer requests were received. For example, an allowed bit rate is 256 kbps, a first bearer request is received with a requested bit rate of 64 kbps, a second bearer request is received with a requested bit rate of 128 kbps, and lastly, a third bearer request is received with a requested bit rate of 128 kbps. In this example, the first two bearer requests will be accepted and the third bearer request will be rejected because the aggregate of the requested bit rates is 64 kbps+128 kbps+128 kbps=320 kbps, which is greater than the allowed bit rate of 256 kbps, and the third bearer request was the last received.

Other embodiments of determining the GBR service for which to provide the reject request can be used without departing from the scope of the current application. If there are bearer requests that are outstanding once the reject response is provided, the method 500 can return to block 515 to determine if the aggregate of the requested bit rates for the outstanding bearer requests exceeds the allowed bit rate. The method 500 then ends.

At block 525, processing logic generates a create request for each GBR service which does not yet have an existing connection, because the aggregate of the requested bit rate associated with the GBR service and the requested bit rate associated with each of the additional GBR services is not greater than a GBR allowed bit rate. Each create request can include the requested bit rate for the respective GBR service, and can cause a session to be created for the service. For example, an allowed bit rate is 256 kbps, a first bearer request is received with a requested bit rate of 32 kbps, a second bearer request is received with a requested bit rate of 64 kbps, and a third bearer request is received with a requested bit rate of 128 kbps. In this example, three bearer requests will be created because the aggregate of the requested bit rates is less than the allowed bit rate: a create request for the first bearer request with a requested bit rate of 32 kbps, a create request for the second bearer request with a requested bit rate of 64 kbps, and a create request for the third bearer requested with a requested bit rate of 128 kbps. After generating a create request for each new GBR service, the method 500 proceeds to block 530.

At block 530, processing logic updates the allowed bit rate based on the requested bit rate for each new GBR service, in one embodiment. In one embodiment, processing logic updates the allowed bit rate by subtracting the requested bit rate for each GBR service from the allowed bit rate to obtain a new value for the allowed bit rate that reflects the GBR service(s) using the bandwidth of the mobile device. For example, an allowed bit rate is 256 kbps, a first GBR service has a requested bit rate of 32 kbps, a second GBR service has a requested bit rate of 64 kbps, and a third GBR service has a requested bit rate of 128 kbps. In this example, the allowed bit rate will be updated to be 256 kbps−32 kbps−64 kbps−128 kbps=32 kbps. Other methods of updating the allowed bit rate based on the requested bit rate for each GBR service can be used without departing from the scope of the present application. The method 500 then ends.

At block 535, processing logic determines whether the requested bit rate exceeds the GBR allowed bit rate. Processing logic can determine whether the requested bit rate exceeds the GBR allowed bit rate by comparing the requested bit rate to the GBR allowed bit rate. If the requested bit rate is not greater than the GBR allowed bit rate, the method 500 proceeds to block 545. If the requested bit rate is greater than a GBR allowed bit rate, the method 500 proceeds to block 540.

At block 540, processing logic provides a reject response for the service. Processing logic provides the reject response because the overall bandwidth, or bit rate, for the GBR services currently using data on the mobile device exceeds the allowed GBR bit rate. Therefore, the service for which the bearer request was received cannot have the requested bit rate and therefore is rejected. Processing logic can provide the reject response to the home wireless network or to the wireless network from which the bearer request was received. The method 500 then ends.

At block 545, processing logic generates a create request for the GBR service for which the bearer request was received. The create request can include the requested bit rate for the GBR service, and can cause a session to be created for the service. Upon generating a create request for each GBR service, the method 500 proceeds to block 550

At block 550, processing logic updates the allowed bit rate based on the requested bit rate for the GBR service. In one embodiment, processing logic updates the allowed bit rate by subtracting the requested bit rate for the GBR service from the allowed bit rate to obtain a new value for the allowed bit rate that reflects that the GBR service is using an additional portion of the bandwidth of the mobile device. For example, an allowed bit rate is 256 kbps and the GBR service has a requested bit rate of 32 kbps. In this example, the allowed bit rate will be updated to be 256 kbps−32 kbps=224 kbps. The method 500 then ends. Other methods of updating the allowed bit rate based on the requested bit rate for the GBR service can be used without departing from the scope of the present application.

FIG. 6 illustrates one embodiment of a method 600 for adjusting bandwidth for guaranteed bit rate (GBR) bearers. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by the traffic hub system 200 of FIG. 2.

At block 605, processing logic receives a bearer request for a service with a requested bit rate and a priority. Processing logic can receive the bearer request from the roaming wireless network of the mobile device executing the service. The bearer request can be a request from a GBR service, or application, and can include the requested bit rate for the GBR service. For example, a streaming application on a mobile device requests a guaranteed bit rate of 64 kbps. The bearer request can include a single requested bit rate for both an upload bit rate and a download bit rate, or can include multiple requested bit rates, such as a requested bit rate for uploading data and a requested bit rate for downloading data. The priority can be a value, such as a numeric value, that represents the importance of the bearer in relation to other bearers. For example, the priority can be 1 for a high priority, 2 for a slightly lower priority, and 3 for the lowest priority. In another example, the priority can be a 1 for the lowest priority, 2 for a slightly higher priority, and 3 for the highest priority.

At block 610, processing logic determines if the requested bit rate exceeds an allowed bit rate. The allowed bit rate can be a maximum bit rate, or throughput value, defined for all services or bearers for the mobile device, across both GBR services and non-GBR services. Processing logic can determine if the requested bit rate exceeds the allowed bit rate by comparing the requested bit rate and the allowed bit rate. If the requested bit rate is not greater than the allowed bit rate, the bearer request is allowable because there is sufficient bandwidth available to provide to the service. If the requested bit rate is not greater than the allowed bit rate, the method 600 proceeds to block 650. If the requested bit rate is greater than the allowed bit rate, there is currently insufficient bandwidth available to provide to the service. If the requested bit rate is greater than the allowed bit rate, the method 600 proceeds to block 615.

At block 615, processing logic determines if the priority for the service exceeds the priorities of non-GBR services currently used by the mobile device. Because non-GBR services do not require a minimum data rate, the bit rates provided to the non-GBR services can be reduced or changed in order to provide the requested bit rate to the service making the bearer request. Processing logic can determine if the priority for the service exceeds the priorities of non-GBR services currently used by the mobile device by comparing the priorities. If the priority for the service is not greater than the priorities of any of the non-GBR services currently used by the mobile device, the method 600 proceeds to block 640. If the priority for the service is greater than the priority of at least one of the non-GBR services currently used by the mobile device, the method 600 proceeds to block 620.

At block 620, processing logic reduces the bit rate of one or more non-GBR services with a lower priority than the priority of the service. Processing logic will reduce the bit rate of the one or more non-GBR services by a total amount equal to the requested bit rate for the service. For example, if the requested bit rate for the service is 64 kbps, the bit rate of the one or more non-GBR services will be reduced a total of 64 kbps. In one embodiment, if the bit rate of the two or more non-GBR services is reduced, the amount reduced for each non-GBR service is proportional to the current bit rate of each non-GBR service. For example, if a first non-GBR service has a bit rate of 64 kbps and a second non-GBR service has a bit rate of 128 kbps, the bit rate of the second non-GBR service will be reduced more than the bit rate of the first non-GBR service.

In one embodiment, processing logic reduces the bit rate of each non-GBR service that has a lower priority than the priority of the service. For example, if the priority of the service is higher than the priority of two non-GBR services, the bit rate of each of the two non-GBR services will be reduced by a total amount equal to the requested bit rate for the service, regardless of the priority of the two non-GBR services in relation to each other. In an alternate embodiment, processing logic reduces the bit rate of the non-GBR services with the lowest priority before reducing the bit rate of non-GBR services with a higher priority (which is still lower than the priority for the service). For example, the priority for the service is 1 (with 1 being the highest priority), two non-GBR services have a priority of 2 and two non-GBR services have a priority of 3 (with 3 being the lowest priority). In this example, the bit rates of the two non-GBR services with the priority of 3 will be reduced first, and the two non-GBR services with the priority of 2 will only be reduced if additional bandwidth is needed to meet the requested bit rate. Other methods of reducing the bit rate based of one or more non-GBR services with lower priority can be used without departing from the scope of the present application. Upon reducing the bit rate of one or more non-GBR services with lower priority, the method 600 then proceeds to block 625.

At block 625, processing logic adjusts the allowed bit rate based on the bandwidth obtained by reducing the bit rate of the one or more services. Processing logic adjusts the allowed bit rate by including (e.g., adding) the amount by which the bit rate of the one or more non-GBR services was reduced. For example, if the allowed bit rate was initially 64 kbps, and a bit rate of a first non-GBR service was reduced by 32 kbps and a bit rate of a second non-GBR service was reduced by 32 kbps, the adjusted allowed bit rate is 64 kbps+32 kbps+32 kbps=128 kbps. The method 600 then proceeds to block 630.

At block 630, processing logic generates a create request for the service for which the bearer request was received. Processing logic can generate the create request to include the requested bit rate for the service, and can cause a session to be created for the service. Upon generating a create request for each GBR service, the method 600 proceeds to block 635.

At block 635, processing logic updates the allowed bit rate based on the requested bit rate for the service. In one embodiment, processing logic updates the allowed bit rate by subtracting the requested bit rate for the service from the allowed bit rate to obtain a new value for the allowed bit rate that reflects the service using the bandwidth of the mobile device. For example, an allowed bit rate is 256 kbps and the service has a requested bit rate of 32 kbps. In this example, the allowed bit rate will be updated to be 256 kbps−32 kbps=224 kbps. Other methods of updating the allowed bit rate based on the requested bit rate for the service can be used without departing from the scope of the present application. The method 600 then ends.

At block 640, processing logic determines whether the priority for the service exceeds the priorities of GBR services currently used by the mobile device. Because GBR services require a guaranteed data rate, the bit rates provided to the GBR services cannot be reduced or changed in order. Thus, in order to provide the requested bit rate to the service making the bearer request, GBR services with a lower priority can be deleted to free additional bandwidth for the service making the bearer request. Processing logic can determine if the priority for the service exceeds the priorities of GBR services currently used by the mobile device by comparing the priorities. If the priority for the service does not exceed the priorities of any of the GBR services currently used by the mobile device, the method 600 proceeds to block 655. If the priority for the service exceeds the priority of at least one of the GBR services currently used by the mobile device, the method 600 proceeds to block 645.

At block 645, processing logic deletes one or more GBR services with a lower priority than the priority of the service. Processing logic deletes GBR services until the total amount of freed bandwidth exceeds the requested bit rate for the service. For example, if the requested bit rate for the service is 64 kbps, GBR services will be deleted until a total of 64 kbps is freed. In on embodiment, processing logic deletes the one or more GBR services by providing a delete request to the mobile device associated with each of the deleted GBR services. In an alternate embodiment, processing logic deletes the one or more GBR services by reducing the bit rate of the deleted GBR services to zero.

In one embodiment, processing logic removes the GBR services with a lower priority than the priority of the service based on the bit rate guaranteed for the GBR service. For example, if the priority of the service is higher than the priority of two GBR services, the GBR service with the bit rate that equals or exceeds, and is closest to, the requested bit rate will be deleted, regardless of the priority of the two GBR services in relation to each other. For example, the requested bit rate is 64 kbps and a first GBR service has a bit rate of 128 kbps and a second GBR service has a bit rate of 64 kbps. In this example, the second GBR service will be deleted because its bit rate is equal to the requested bit rate of 64 kbps.

In an alternate embodiment, processing logic deletes the GBR services with the lowest priority before deleting GBR services with a higher priority (which is still lower than the priority for the service). In this embodiment, if there are multiple GBR services with the same lowest priority, the GBR service with the bit rate that equals or exceeds, and is closest to, the requested bit rate will be deleted. For example, a requested bit rate is 64 kbps, the priority for the service is 1 (with 1 being the highest priority), a GBR service has a priority of 2 with a bit rate of 64 kbps, a GBR service has a priority of 3 (with 3 being the lowest priority) with a bit rate of 128 kbps, and a GBR service has a priority of 3 with a bit rate of 64 kbps. In this example, the GBR service with the priority of 3 and the bit rate of 64 kbps will be deleted because it has the lowest priority and a bit rate that equals the requested bit rate. Other methods of deleting one or more GBR services with lower priority can be used without departing from the scope of the present application. Upon deleting one or more GBR services with lower priority, the method 600 then proceeds to block 650.

At block 650, processing logic adjusts the allowed bit rate based on the bandwidth obtained by deleting the one or more GBR services. Processing logic can adjust the allowed bit rate by including (e.g., adding) the amount of the bit rates of the one or more deleted GBR services. For example, if the allowed bit rate was initially 64 kbps, and a bit rate of a first GBR service was 32 kbps and a bit rate of a second GBR service was 64 kbps, the adjusted allowed bit rate is 64 kbps+32 kbps+64 kbps=160 kbps. Upon adjusting the allowed bit rate, the method 600 then proceeds to block 630.

At block 655, processing logic provides a reject response for the service because the requested bit rate cannot be provided to the service due to the fact that the bit rate of non-GBR services cannot be reduced and no GBR services can be deleted. Processing logic can provide the reject response to the home wireless network or to the wireless network from which the bearer request was received.

Figure 7:
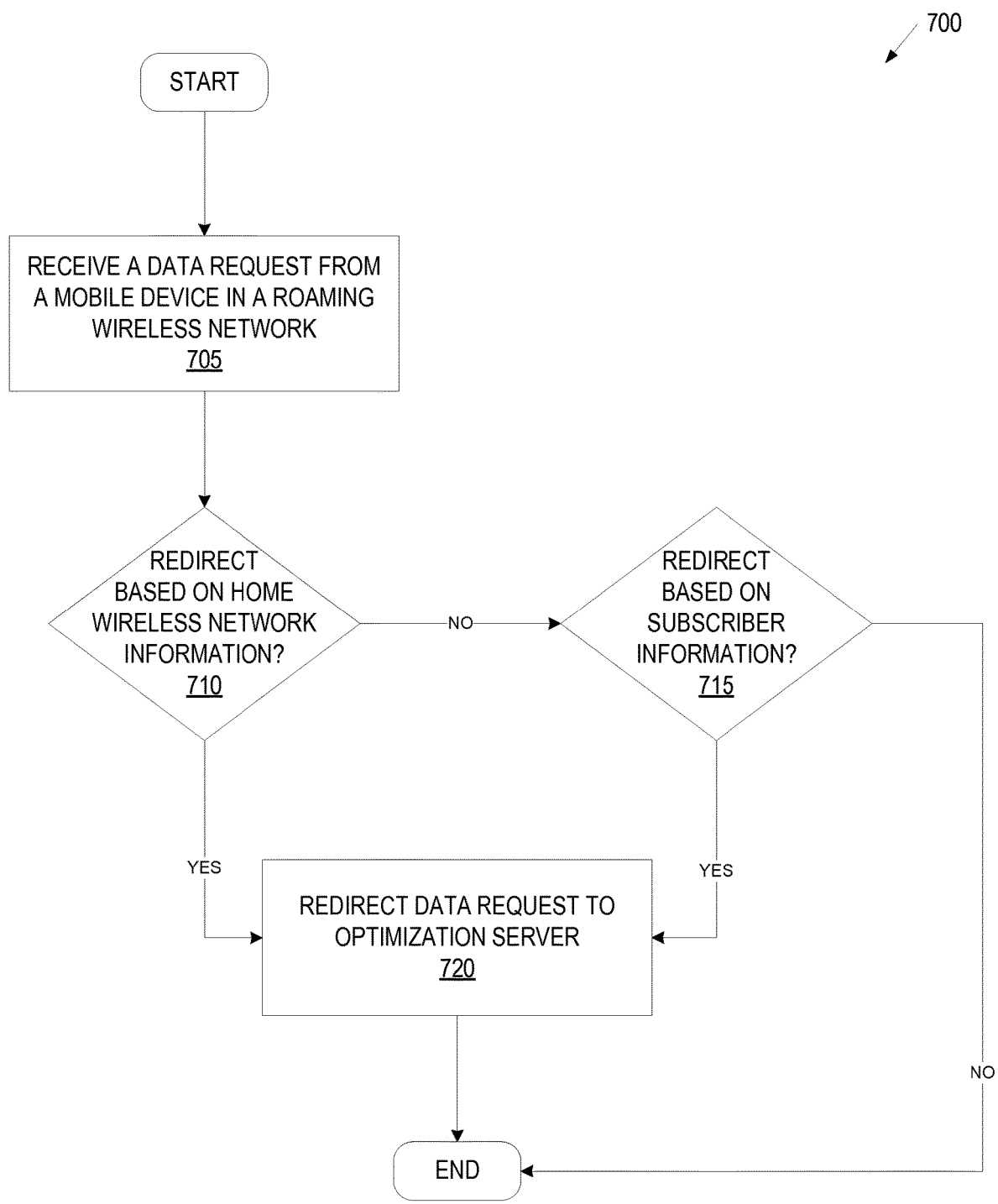
FIG. 7 illustrates an embodiment of redirection.

FIG. 7 illustrates one embodiment of a method 700 for redirection. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by the traffic hub system 200 of FIG. 2.

At block 705, processing logic receives a data request from a mobile device in a roaming wireless network. The data request can include subscriber information associated with the mobile device and home wireless network information associated with the mobile device. The subscriber information can include an identifier of a subscriber that uses the mobile device, an identifier of the mobile device, or any other identifier that identifies a user making the data request. The home wireless information can include an end user internet protocol (IP) allocated by the home wireless network (e.g., home support node, home gateway, etc.).

At block 710, processing logic determines whether to redirect the data request based on the home wireless network information associated with the mobile device. Processing logic can determine whether to redirect the data request based on the home wireless network information by determining whether the home wireless network information is included in a static policy of HTTP traffic redirection. For example, if the home wireless network information is an end user IP allocated by the home gateway (PGW) of x.y.z.1, and if the static policy includes x.y.z.1, then processing logic will determine that the data request should be redirected. Multiple home networks can be supported by the processing logic, therefore allowing the subscribers of some home networks to be optimized while the subscribers of other home networks may not be optimized. If processing logic determines to redirect the data request based on the home wireless network information associated with the mobile device, the method 700 proceeds to block 720. If processing logic determines not to redirect the data request based on the home wireless network information associated with the mobile device, the method 700 proceeds to block 715.

At block 715, processing logic determines whether to redirect the data request based on the subscriber information associated with the mobile device. Processing logic can determine whether to redirect the data request based on the subscriber information by determining whether the subscriber information is included in a dynamic policy of HTTP traffic redirection. For example, if the subscriber information is identified as a business subscriber that is not a VIP, then processing logic will determine that the data request should be redirected because that business subscriber is not a VIP. In this example, if the subscriber information is identified as a business subscriber that is a VIP, processing logic will determine that the data request should not be redirected because the subscriber is a VIP and should not be optimized. Therefore, processing logic can perform subscriber level redirection dynamically. If processing logic determines not to redirect the data request based on the subscriber information associated with the mobile device, the process continues to block 720.

At block 720, the processing logic determines whether to redirect based on the subscription level of the subscriber. In one embodiment, if the user's bandwidth is throttled, or if the user has no remaining roaming bandwidth available, the system may redirect to enable the subscriber to purchase additional bandwidth.

If none of the redirections are needed, the method 700 ends. If processing logic determines to redirect the data request based on the subscriber information associated with the mobile device, the method 700 proceeds to block 75.

At block 725, processing logic redirects the data request. Processing logic can redirect the data request by modifying the destination IP and/or transmission control protocol (TCP) headers of the data request with the IP address and TCP ports of the optimization server. This will cause the data request to be redirected. The redirection may be to an optimization server to optimize the data request. The redirection may be to a subscription server, or subscription application, to renew the user's subscription for roaming data use. The redirection may be for some other purpose. The redirection described does not require any action by the subscriber, home network, or roaming network. It is automatic, when appropriate.

Figure 8:
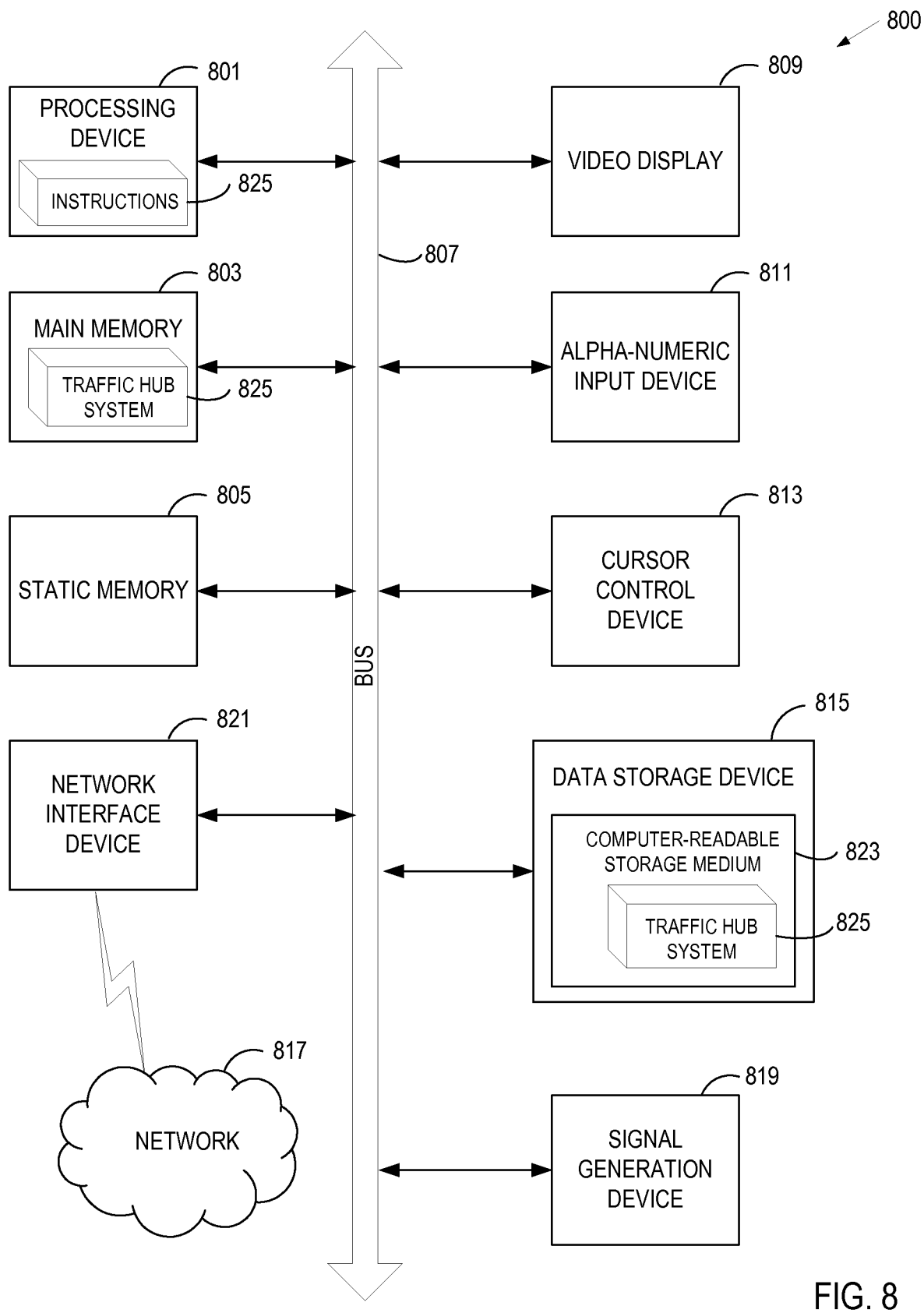
FIG. 8 is a block diagram of one embodiment of a computer system that may be used with the present invention.

FIG. 8 is a diagram of one embodiment of a computer system controlling creation of a product at a factory level. Within the computer system 800 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 801, a main memory 803 (e.g., read-only memory (ROM), flash memory, dynamic random access memory (DRAM) such as synchronous DRAM (SDRAM) or DRAM (RDRAM), etc.), a static memory 805 (e.g., flash memory, static random access memory (SRAM), etc.), and a secondary memory 815 (e.g., a data storage device in the form of a drive unit, which may include fixed or removable computer-readable storage medium), which communicate with each other via a bus 807.

Processing device 801 represents one or more general-purpose processing devices such as a microprocessor, central processing unit, or the like. More particularly, the processing device 801 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 801 may also be one or more special-purpose processing devices such as an application specific integrated circuit (ASIC), a field programmable gate array (FPGA), a digital signal processor (DSP), network processor, or the like. Processing device 801 is configured to execute the traffic hub system 825 for performing the operations and steps discussed herein.

The computer system 800 may further include a network interface device 821. The computer system 800 also may include a video display unit 809 (e.g., a liquid crystal display (LCD) or a cathode ray tube (CRT)) connected to the computer system through a graphics port and graphics chipset, an alphanumeric input device 811 (e.g., a keyboard), a cursor control device 813 (e.g., a mouse), and a signal generation device 819 (e.g., a speaker).

The secondary memory 815 may include a machine-readable storage medium (or more specifically a computer-readable storage medium) 823 on which is stored one or more sets of instructions (e.g., the traffic hub system 825) embodying any one or more of the methodologies or functions described herein. The traffic hub system 825 may also reside, completely or at least partially, within the main memory 803 and/or within the processing device 801 during execution thereof by the computer system 800, the main memory 803 and the processing device 801 also constituting machine-readable storage media. The traffic hub system 825 may further be transmitted or received over a network 817 via the network interface device 821.

The computer-readable storage medium 823 may also be used to store the traffic hub system 825 persistently. While the computer-readable storage medium 823 is shown in an exemplary embodiment to be a single medium, the term "computer-readable storage medium" should be taken to include a single medium or multiple media (e.g., a centralized or distributed database, and/or associated caches and servers) that stores the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The traffic hub system 825, components and other features described herein (for example in relation to FIG. 1) can be implemented as discrete hardware components or integrated in the functionality of hardware components such as ASICS, FPGAs, DSPs or similar devices. In addition, the traffic hub system 825 can be implemented as firmware or functional circuitry within hardware devices. Further, the traffic hub system 825 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "generating," "providing," negotiating," "updating," "requesting," "receiving," "aggregating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for negotiating bandwidth in a wireless network environment has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A traffic hub system comprising:
   a roaming data module to send and receive data for a roaming wireless network for a mobile device, the mobile device comprising a service utilizing a high-speed data network;
   a home data module to send and receive data for a home wireless network for the mobile device, the home wireless network being a different network than the roaming wireless network, the home wireless network comprising a packet data network gateway;
   a bandwidth negotiation module to negotiate a bandwidth for the mobile device with the roaming wireless network based on a home network policy, when the mobile device is in the roaming wireless network;
   wherein the bandwidth negotiation module negotiates the bandwidth with the roaming wireless network by executing the steps comprising:
      providing a bit rate request to a service delivery platform server for an allowed bit rate associated with the service based on the home network policy;
      providing a create request to the home wireless network based on the allowed bit rate for the service;
      providing a create response to the roaming wireless network based on the allowed bit rate for the service; and
      determining whether the allowed bit rate for the service is updated.

2. The traffic hub system of claim 1, further comprising:
   a subscription refresh module to automatically load/refresh a subscription of the subscriber without requiring the subscriber to provide identification information to the roaming wireless network or the home wireless network.

3. The traffic hub system of claim, 1 further comprising:
   a data offload module to offload selected subscriber data traffic, wherein the selected subscriber data traffic is offloaded by sending the selected subscriber data traffic to the Internet without providing the selected subscriber data traffic to the home wireless network, such that the subscriber is not charged a monetary amount for the selected subscriber data traffic.

4. The traffic hub system of claim 1, wherein the high-speed data network is one of a long-term evolution (LTE) network or a high-speed packet access (HSPA) network.

5. The traffic hub system of claim 1, wherein the redirection module determines whether to redirect the subscriber data based on the first predetermined value by determining whether the first predetermined value is included in a static policy of HTTP traffic redirection.

6. The traffic hub system of claim 1, wherein the redirection module determines whether to redirect the subscriber data based on the second predetermined value by determining whether the second predetermined value is included in a dynamic policy of HTTP traffic redirection.

7. The traffic hub system of claim 1, further comprising:
a traffic control module to update the quality of service parameter based on the negotiated bandwidth, transparently to the roaming wireless network and without enforcement of the home network policy by the home wireless network.

8. The traffic hub system of claim 1, further comprising:
a redirection module to redirect subscriber data traffic based on a home wireless network identifier associated with the home wireless network or an identifier associated with the subscriber, wherein the redirection module redirects the subscriber data traffic to an optimization server coupled to the traffic hub system, and wherein the optimization server provides optimized subscriber data to the traffic hub system.

9. A method comprising:
sending and receiving data, by a processor in a traffic hub, for a roaming wireless network for a mobile device, the mobile device comprising a service utilizing a high-speed data network;
sending and receiving data, by the processor, for a home wireless network for the mobile device, the home wireless network being a different network than the roaming wireless network, the home wireless network comprising a packet data network gateway;
negotiating with the roaming wireless network a negotiated bandwidth for the mobile device with the roaming wireless network based on a home network policy, when the mobile device is in the roaming wireless network, wherein the negotiated bandwidth is negotiated by executing the steps comprising:
providing a bit rate request to a service delivery platform server for an allowed bit rate associated with the service based on the home network policy;
providing a create request to the home wireless network based on the allowed bit rate for the service;
providing a create response to the roaming wireless network based on the allowed bit rate for the service; and
determining whether the allowed bit rate for the service is updated.

10. The method of claim 9, further comprising:
automatically loading/refreshing a subscription of the subscriber without requiring the subscriber to provide identification information to the roaming wireless network or the home wireless network.

11. The method of claim 9, further comprising:
offloading selected subscriber data traffic, by sending the selected subscriber data traffic to the Internet without providing the selected subscriber data traffic to the home wireless network, such that the subscriber is not charged a monetary amount for the selected subscriber data traffic.

12. The method of claim 9, wherein the high-speed data network is one of a long-term evolution (LTE) network or a high-speed packet access (HSPA) network.

13. The method of claim 9, further comprising:
determining whether to redirect the subscriber data based on the first predetermined value by determining whether the first predetermined value is included in a static policy of HTTP traffic redirection.

14. The method of claim 9, further comprising:
determining whether to redirect the subscriber data based on the second predetermined value by determining whether the second predetermined value is included in a dynamic policy of HTTP traffic redirection.

15. The method of claim 9, further comprising:
redirecting subscriber data traffic based on a home wireless network identifier associated with the home wireless network or based on an identifier associated with the subscriber, wherein the subscriber data traffic is redirected to an optimization server, and wherein the optimization server provides optimized subscriber data to the traffic hub system.

16. A non-transitory machine-readable storage medium having instructions that, when executed by a processing device, cause the processing device to perform operations comprising:
sending and receiving data, by a processor in a traffic hub, for a roaming wireless network for a mobile device, the mobile device comprising a service utilizing a high-speed data network;
sending and receiving data, by the processor, for a home wireless network for the mobile device, the home wireless network being a different network than the roaming wireless network, the home wireless network comprising a packet data network gateway;
negotiating with the roaming wireless network a negotiated bandwidth for the mobile device with the roaming wireless network based on a home network policy, when the mobile device is in the roaming wireless network, wherein the negotiated bandwidth is negotiated by executing the steps comprising:
providing a bit rate request to a service delivery platform server for an allowed bit rate associated with the service based on the home network policy;
providing a create request to the home wireless network based on the allowed bit rate for the service;
providing a create response to the roaming wireless network based on the allowed bit rate for the service; and
determining whether the allowed bit rate for the service is updated.

17. The non-transitory machine-readable storage medium of claim 16, wherein the instructions, when executed by the processing device, cause the processing device to perform operations further comprising:
automatically loading/refreshing a subscription of the subscriber without requiring the subscriber to provide identification information to the roaming wireless network or the home wireless network.

18. The non-transitory machine-readable storage medium of claim 16, wherein the instructions, when executed by the processing device, cause the processing device to perform operations further comprising:
offloading selected subscriber data traffic, wherein the selected subscriber data traffic is offloaded by sending the selected subscriber data traffic to the Internet without providing the selected subscriber data traffic to the home wireless network, such that the subscriber is not charged a monetary amount for the selected subscriber data traffic.

19. The non-transitory machine-readable storage medium of claim 16, wherein the high-speed data network is one of a long-term evolution (LTE) network or a highspeed packet access (HSPA) network.

20. The non-transitory machine-readable storage medium of claim 16, wherein subscriber data traffic is redirected based on a home wireless network identifier associated with the home wireless network or based on an identifier associated with the subscriber, wherein the subscriber data traffic is redirected to an optimization server, and wherein the optimization server provides optimized subscriber data to the traffic hub system.

* * * * *